July 31, 1962
D. A. GORDON
3,047,536
POLYESTERS
Filed Feb. 5, 1957
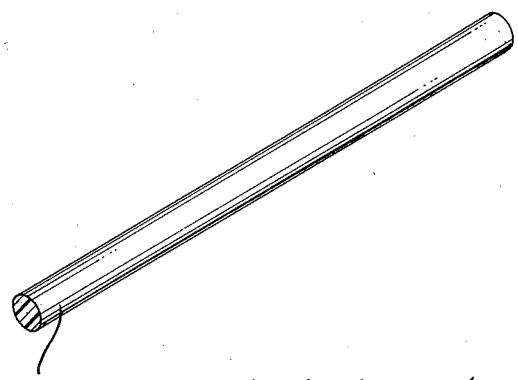
High melting polyester filament fabricated with composition derived from hydroxybenzenedi-carboxylic acid.
INVENTOR.
David A. Gordon
BY
Griswold & Burdick
ATTORNEYS

United States Patent Office 3,047,536
Patented July 31, 1962

3,047,536
POLYESTERS
David A. Gordon, Midland, Mich., assignor to The Dow Chemical Company, Midland, Mich., a corporation of Delaware
Filed Feb. 5, 1957, Ser. No. 638,259
15 Claims. (Cl. 260—47)

The main purpose and concern of this invention is to provide novel synthetic high polymers that are linear in structure and of the general formula:

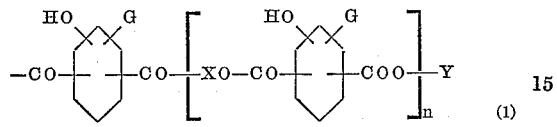
(1)

wherein G is hydroxyl or a hydrogen atom; X and Y are the same (in which case they may both be represented by the symbol R) or independently different, two to ten carbon atom-containing bivalent radicals that have been derived from glycols and polyglycols; and $n$ is a plural integer. One of its objects is to furnish shaped articles therefrom.

The polyester products of the invention, many of which have unusually high melting points and which frequently have fiber-forming among other properties, may be prepared in a known manner by the condensation of suitable mono- or dihydroxybenzenedicarboxylic acids or lower alkyl esters thereof with aliphatic glycols or with polyglycols. The latter compounds, as is apparent, provide bivalent radicals which have ether linkages or hetero oxygen atoms in their structures. Since the free acids are often difficult to purify, it may be an advantage to start with their methyl, ethyl or other lower alkyl esters in the synthesis of the polyester product. According to the known procedures, the synthesis is readily accomplished by first preparing a self-polymerizing "monomer" or bis(hydroxyalkyl) mono- or dihydroxybenzenedicarboxylate from the free acid, or its ester, with a glycol. In this reaction, it is preferable to employ an excess of the glycol and a suitable catalyst. Polymerization of the desired product can then be accomplished in the same reaction mass that is used for preparation of the "monomer" by the self ester alcoholysis thereof. This is best done at elevated temperatures while stripping the alcohol that is formed during the reaction and removing the excess glycol by azeotropic distillation at its termination. Methods and techniques that are similar and analogous to those in U.S. 2,465,319 may also be used successfully for preparing the polyesters of the present invention.

The following formulae represent the complete synthesis of a typical high polymer polyester (i.e., one having a molecular weight greater than about 5,000 and advantageously for fiber-forming an other fabricating purposes, in excess of 15,000 or so) in accordance with the invention starting with free 4,6-dihydroxyisophthalic acid. The acid is first converted in a known way to its ethyl ester with a very large excess of alcohol, say in the neighborhood of about one-thousand percent, using sulfuric acid as a catalyst. "Monomer" is in turn prepared from the ester in a large excess of ethylene glycol, say in the neighborhood of one-hundred percent. The "monomer" is then self-polymerized in the same reaction mass to form the polyester. An inert high boiling liquid vehicle (such as biphenyl or the like) may advantageously be employed for the reaction mass.

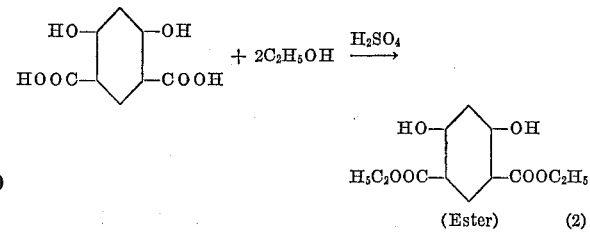
(Ester) (2)

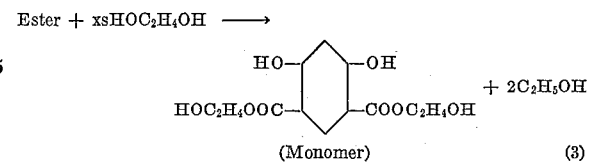
(Monomer) (3)

Monomer $\xrightarrow{\Delta}$

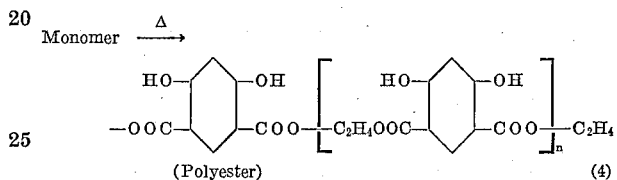
(Polyester) (4)

The mono- or dihydroxybenzene-dicarboxylic acids employed in the synthesis may be represented by the following structure, wherein G is as above described. As is apparent herein, the product polyesters of the present invention may also be represented by the general formula:

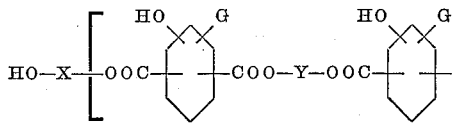
(1A)

wherein X, Y, G and $n$ are as defined in Formula 1, with the limitation that the ester-forming carboxyl units on each of the aromatic nuclei are not positioned ortho to one another thereon.

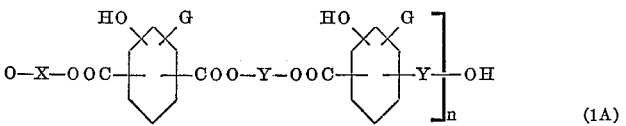
(5)

These acids are readily obtained from such common and widely available raw materials as phenol, catechol, resorcinol and the like, using, for example, the Kolbe-Schmitt reaction for their preparation. The following equations typify the preparation of the acids according to this reaction:

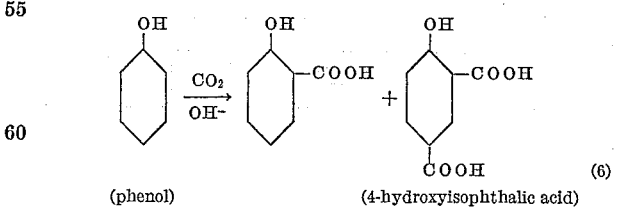
(phenol)    (4-hydroxyisophthalic acid) (6)

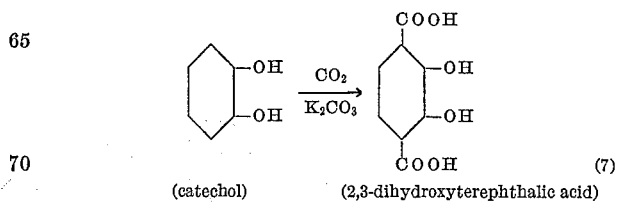
(catechol)    (2,3-dihydroxyterephthalic acid) (7)

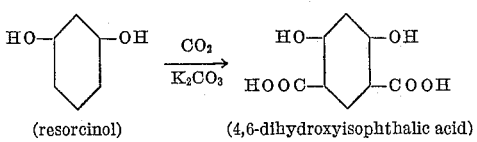

(resorcinol) → (4,6-dihydroxyisophthalic acid) (8)

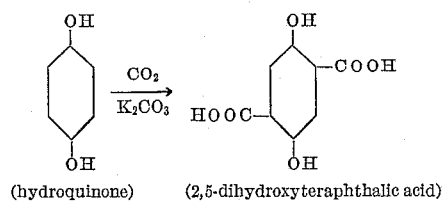

(hydroquinone) → (2,5-dihydroxyterephthalic acid) (9)

The glycols and polyglycols that are employed are of the series HOZOH, wherein Z is a straight or branched chain alkylene group containing two to ten and, advantageously, two to six carbon atoms, or an analogous bivalent oxygen containing radical of the type normally present in such polyglycols as diethylene glycol and the like. As is apparent, mixtures of glycols or polyglycols, or both, can be used in the polymers. Likewise, mixtures of the acids or their esters can be employed with mixed or unmixed glycols. This, as it were, provides various copolyester products that may have desirable specific properties.

For further illustration, a series of polyesters were prepared with various mono- and dihydroxy-benzenedicarboxylic acids and various glycols and polyglycols. Each of the polymers were prepared by reacting their methyl or ethyl esters with an excess of the glycol or polyglycol in the presence of about 0.1 percent by weight of zinc borate catalyst in 1-methylnaphthalene with stirring in a nitrogen atmosphere. The reactions were each continued at an elevated reflux temperature for about a day and additionally conducted for about an hour after all of the excess glycol or polyglycol had been distilled over. The product was then cooled to room temperature in a nitrogen, atomsphere, filtered, washed and dried under a vacuum. The following tabulation identifies the compositions of the various polyester products that were made and includes their melting points.

| Polymer | Dicarboxylic Acid | Glycol | Melting Point, °C. |
|---|---|---|---|
| "A" | 4-Hydroxyisophthalic | Ethylene | 316-330 |
| "B" | 4,6-Dihydroxyisophthalic | do | more than 340 |
| "C" | do | Diethylene | 290-300 |
| "D" | do | Propylene | 328 |
| "E" | do | Trimethylene | 202-217 |
| "F" | do | Tetramethylene | 270-300 |
| "G" | do | Neopentyl | 165 |
| "H" | do | Hexamethylene | 138-165 |
| "J" | do | Decamethylene | 92-103 |
| "K" | 2,3-Dihydroxyterephthalic | Ethylene | 210-235 |
| "L" | 2,5-Dihydroxyterephthalic | do | more than 340 |
| "M" | do | Trimethylene | 172-190 |
| "N" | do | Diethylene | 167-175 |
| "P" | 4-Hydroxyisophthalic | Propylene | 283-320 |

Each of the products was a hard, resinous material that could be dissolved to greater or lesser extents in dimethylformamide or aqueous caustic solution and reprecipitated from the latter upon acidification. They were completely insoluble, however, in most other of the common solvents. All of the polymers, excepting "B" and "L," could be drawn or extruded as a melt into fibers that were orientable by stretching and could also be molded into various shapes. The extremely high melting points of polymers "B" and "L" made it impractical to accomplish this with the apparatus that was available for such purposes.

In comparison with the foregoing a polyester of isophthalic acid and ethylene glycol prepared in a similar manner has a melting point of about 105° C. A polyester of terephthalic acid and propylene glycol melts at about 122° C. and one of terephthalic acid and ethylene glycol at 260° C. The unusually high melting points of so many of the polyesters of the present invention is believed to be due, in most cases, to the presence and spacing therein of the polar groups which, coupled with the chain flexibility and symmetry of the polymers, provides for their having a considerably high intermolecular hydrogen bonding index, with the possible exception of certain of those derived from the 2,3-dihydroxyterephthalic acid. It is significant that the melting points of the polymers derived from acids other than the 2,3-acid are higher than corresponding polyesters from unsubstituted benzene dicarboxylic acids.

The presence of unreacted hydroxyl groups in the polymers of the invention also favors their ready acceptance of basic, direct, azo and the like types of dystuffs and their provision of relatively static-free filamentary and other articles.

Surprisingly enough, the polyesters of the present invention are not cross-linked. They are completely linear and thermoplastic in nature. This was proven by the fact, among other evidences, that no phenyl ester groups were detectable upon infra-red analyses of the above-identified species. It was further indicated by the reaction of each of the products with various diazonium salts (which link to free phenolic hydroxyl groups) to form highly colored materials. Further evidence of the unlikelihood of cross-linking in the polymers of the invention was provided by analysis of the observations of several tests in which there were complete failures to form phenyl esters when the methyl and ethyl esters of the hydroxybenzenedicarboxylic acids were reacted with phenols in the presence of acid catalysts. In this connection, it is significant to note the variations in melting points of the individual products that were prepared from different glycols. If significant cross-linking had occurred, each of the products should have been completely infusible, or substantially so. Obviously, they were not.

A shaped filamentary article in accordance with the present invention is schematically represented in the hereto-annexed drawing.

What is claimed is:

1. Polyester of the general formula:

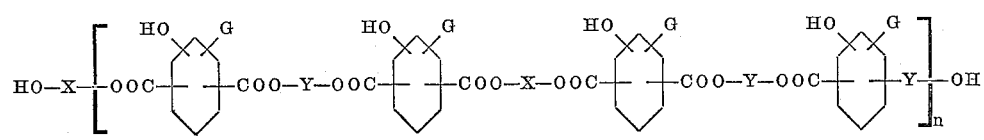

wherein G is selected from the group consisting of a hydroxyl radical and a hydrogen atom; X and Y are independent, two to ten carbon atom-containing bivalent radicals derived from the group consisting of glycols and polyglycols; and n is a plural integer of such magnitude that the molecular weight of said polyester is at least about 5,000, with the limitation that the ester-forming carboxyl units on each of the aromatic nuclei are being positioned on carbon atoms separated by at least one other carbon atom.

2. The polyester of claim 1, wherein G is a hydroxyl radical.
3. The polyester of claim 1, wherein G is a hydrogen atom.
4. The polyester of claim 1, wherein X and Y are independent two to six carbon atom-containing radicals.
5. The polyester of claim 1, wherein X and Y are identical.
6. A high polymer having a molecular weight of at least about 15,000 according to claim 1.
7. A high polymer consisting, in linear recurrence, of the unit

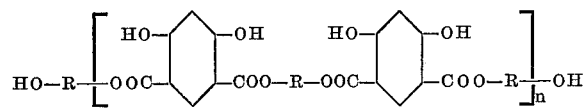

wherein R is a two to six carbon atom-containing radical; and n is a plural integer of such magnitude that the molecular weight of the polyester is at least about 5,000.

8. A high polymer consisting, in linear recurrence, of the unit

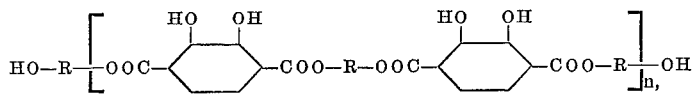

wherein R is a two to six carbon atom-containing radical; and n is a plural integer of such magnitude that the molecular weight of the polyester is at least about 5,000.

9. A high polymer consisting, in linear recurrence, of the unit

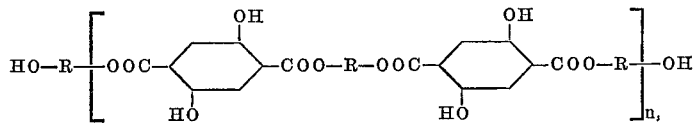

wherein R is a two to six carbon atom-containing radical; and n is a plural integer of such magnitude that the molecular weight of the polyester is at least about 5,000.

10. A high polymer consisting, in linear recurrence, of the unit

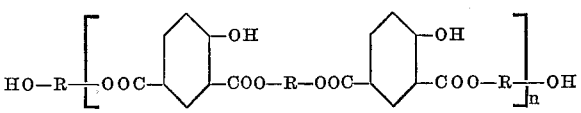

wherein R is a two to six carbon atom-containing radical; and n is a plural integer of such magnitude that the molecular weight of the polyester is at least about 5,000.

11. Filamentary articles from the polyester of claim 1.
12. Filamentary articles from the high polymer of claim 7.
13. Filamentary articles from the high polymer of claim 8.
14. Filamentary articles from the high polymer of claim 9.
15. Filamentary articles from the high polymer of claim 10.

References Cited in the file of this patent

UNITED STATES PATENTS

| | | |
|---|---|---|
| 2,350,326 | Du Vall | June 6, 1944 |
| 2,471,023 | Cook | May 24, 1949 |
| 2,662,093 | Billica | Dec. 8, 1953 |
| 2,753,373 | Hutchings et al. | July 3, 1956 |
| 2,887,468 | Caldwell et al. | May 19, 1959 |